United States Patent [19]

Sertich

[11] Patent Number: 5,070,835

[45] Date of Patent: Dec. 10, 1991

[54] INTERNAL COMBUSTION ENGINE WITH TWO-STAGE COMBUSTION CHAMBER

[76] Inventor: Anthony T. Sertich, 137 MacIntyre La., Allendale, N.J. 07401

[21] Appl. No.: 712,928

[22] Filed: Jun. 7, 1991

[51] Int. Cl.[5] ........................ F02B 19/02; F02B 49/04

[52] U.S. Cl. .................................... 123/289; 123/292

[58] Field of Search ................................ 123/289, 292

[56] References Cited

U.S. PATENT DOCUMENTS

| | | | |
|---|---|---|---|
| 4,372,264 | 2/1983 | Trucco | 123/292 |
| 4,401,072 | 8/1983 | Ito et al. | 123/292 |
| 4,406,260 | 9/1983 | Burley | 123/292 |

FOREIGN PATENT DOCUMENTS

| | | | |
|---|---|---|---|
| 239427 | 9/1925 | United Kingdom | 123/289 |

*Primary Examiner*—E. Rollins Cross
*Assistant Examiner*—Robert E. Mates
*Attorney, Agent, or Firm*—Samuelson & Jacob

[57] ABSTRACT

An improvement in an internal combustion engine of type in which a piston reciprocates in a cylinder to compress a charge of fuel within a combustion chamber within which the charge of fuel is ignited to burn and drive the piston through a power stroke, the improvement providing the combustion chamber with a first stage chamber and a second stage chamber communicating with one another through a valve operated in synchronism with reciprocation of the piston to close communication between the first stage chamber and the second stage chamber as the piston approaches top dead center so as to enable ignition and burning of a first portion of the charge of fuel in the first stage chamber, isolated from a second portion of the charge of fuel in the second stage chamber, and then to open communication between the first stage chamber and the second stage chamber to effect ignition of the second portion of the charge of fuel in the second stage chamber by the combustion products of the first portion of the charge of fuel and completion of the power stroke of the piston.

8 Claims, 1 Drawing Sheet

60 40 34 56 58 36 42 44 46 45 54 48 54 52 10 52 50 14 12 16

INTERNAL COMBUSTION ENGINE WITH TWO-STAGE COMBUSTION CHAMBER

The present invention relates generally to internal combustion engines and pertains, more specifically, to an improvement in internal combustion engines of the type in which a piston reciprocates within a cylinder, driven by the combustion of a charge of fuel in a combustion chamber.

The current demand for greater fuel economy and reduced pollution has led to the quest for internal combustion engines with increased fuel efficiency and decreased unwanted emissions. The present invention provides an improvement in internal combustion engines for achieving that result and exhibits several objects and advantages, some of which are summarized as follows: Enables more complete combustion of fuel for greater fuel efficiency and reduced emission of unwanted pollutants; provides a relatively simple modification which is adapted readily to existing internal combustion engine configurations, for widespread use in virtually all internal combustion engines of the type in which a piston reciprocates within a cylinder driven by the combustion of a charge of fuel in a combustion chamber; requires a minimum number of added parts for a maximum benefit; attains improved performance with minimal modification of current engine design; achieves added flexibility of operation, with increased power derived without a concomitant increase in fuel consumption; enables the modification of two-stroke as well as four-stroke engines for essentially universal application to current internal combustion reciprocating engine designs; is accomplished with component parts of simplified design and rugged construction for reliable performance over an extended service life.

The above objects and advantages, as well as further objects and advantages, are attained by the present invention which may be described briefly as an improvement in an internal combustion engine of the type in which a piston reciprocates within a cylinder toward a top dead center position to compress a charge of fuel within a combustion chamber, within which combustion chamber the charge is ignited by ignition means so as to burn and drive the piston away from the top dead center position through a power stroke, the improvement comprising: a first stage chamber and a second stage chamber communicating with one another to establish the combustion chamber; and valve means for operation in synchronism with the reciprocation of the piston in the cylinder to close communication between the first stage chamber and the second stage chamber and isolate a first portion of the charge of fuel in the first stage chamber from a second portion of the charge of fuel in the second stage chamber when the piston reaches a predetermined position during movement of the piston toward the top dead center position; the ignition means including an igniter operated by the ignition means in synchronism with the reciprocation of the piston in the cylinder to ignite the first portion of the charge of fuel in the first stage chamber so as to burn the first portion of the charge of fuel when the first portion is isolated from the second portion; the valve means further operating to open communication between the first stage chamber and the second stage chamber subsequent to ignition of the first portion of the charge of fuel to effect ignition of the second portion of the charge by the first portion of the charge and completion of the power stroke of the piston.

The invention will be understood more fully, while still further objects and advantages will become apparent, in the following detailed description of a preferred embodiment of the invention illustrated in the accompanying drawing, in which.

Figure 1:
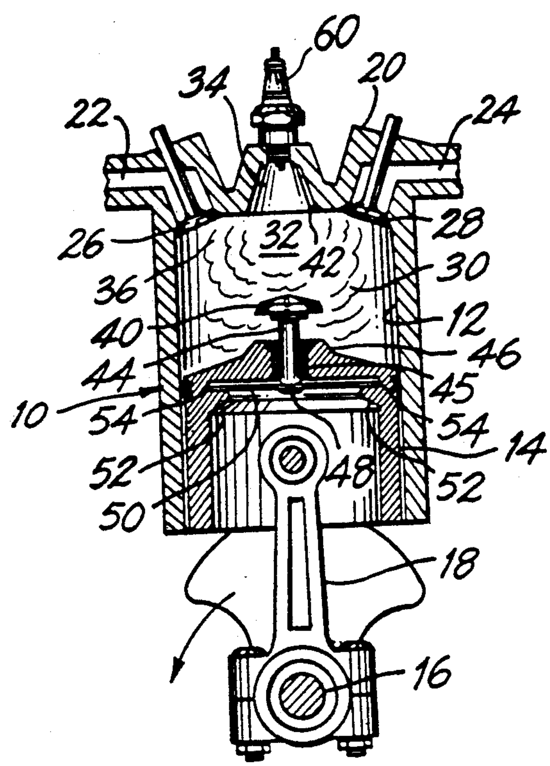
FIG. 1 is a somewhat schematic, longitudinal cross-sectional view of a working piston and cylinder arrangement in an internal combustion engine constructed in accordance with the improvement of the present invention.
Figure 2:
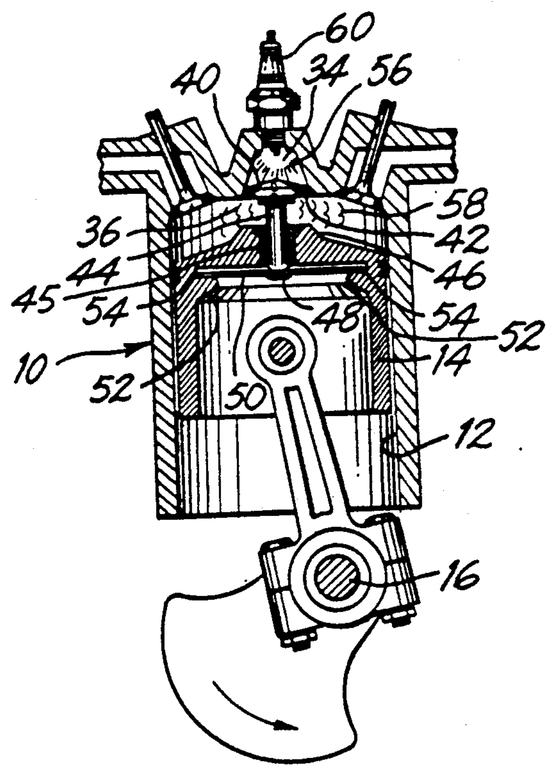
FIG. 2 is a view similar to FIG. 1, with the component parts in another operating position.
Figure 3:
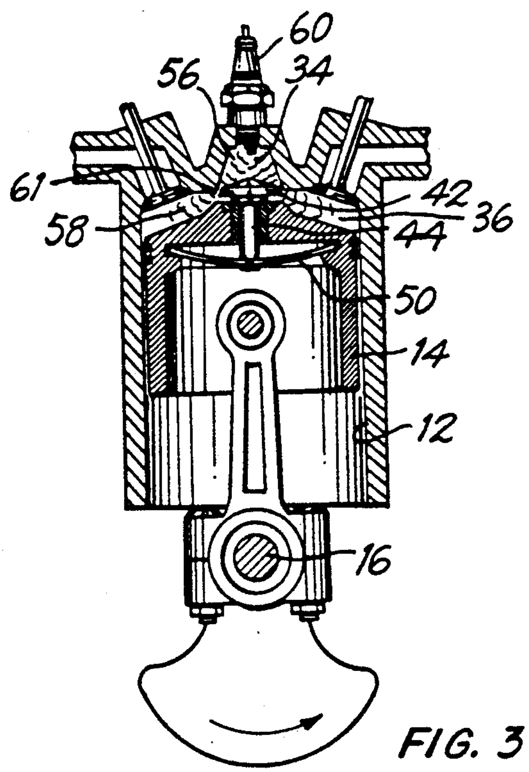
FIG. 3 is another view similar to FIG. 1, with the component parts in still another operating position.

Referring now to the drawing, and especially to FIGS. 1 through 3 thereof, a working portion of an internal combustion engine 10 is seen to include a cylinder 12 within which a piston 14 reciprocates to rotate a crankshaft 16, through a connecting rod 18, in a manner now conventional in reciprocating internal combustion engines. The cylinder 12 includes a cylinder head 20 through which an intake passage 22 and an exhaust passage 24 communicate with the cylinder 12. An intake valve 26 and an exhaust valve 28 are operated in synchronism with the reciprocating movement of the piston 14 to admit a charge of fuel into the cylinder 12 so that the charge of fuel can be compressed and then burned to drive the piston 14 through a power stroke, in a well-known manner.

Thus, in FIG. 1, the piston 14 is shown in the bottom dead center position, a charge of fuel, such as a conventional mixture of air and a hydrocarbon, as illustrated at 30, has been admitted into the cylinder 12, and the intake valve 26 and the exhaust valve 28 are closed in preparation for an upward compression stroke of the piston 14 to compress the charge of fuel 30 into a combustion chamber 32 juxtaposed with the cylinder head 20. In the improvement of the present invention, the combustion chamber 32 is constructed in a two-stage configuration and includes a first stage chamber 34 and a second stage chamber 36. The first stage chamber 34 is located in the cylinder head 20 and preferably has a frusto-conical configuration. As the piston 14 moves upwardly toward the top dead center position, the charge of fuel 30 is compressed, in both the first stage chamber 34 and the second stage chamber 36, since both the first stage chamber 34 and the second stage chamber 36 are in open communication with one another.

When the piston 14 reaches the predetermined position illustrated in FIG. 2, communication between the first stage chamber 34 and the second stage chamber 36 is closed by valve means illustrated in the form of a valve member 40 carried by the piston 14 so as to be seated in a complementary valve seat 42 in the cylinder head 20 in synchronism with the movement of piston 14. Valve member 40 is actuated by valve member actuating means shown in the form of a valve stem 44 integral with the valve member 40 and received within a bushing 45 secured within top 46 of the piston 14 to pass through the top 46 of the piston 14 and be affixed at 48 to resilient biasing means in the form of a leaf spring 50 coupled to the piston 14, beneath the top 46 of the piston 14, by projections 52 unitary with the piston 14 and projecting radially inwardly to support the ends 54 of the leaf spring 50. Upon such closing of communication between the first stage chamber 34 and the second stage chamber 36, the charge of fuel 30 is divided into a first portion 56 within the first stage chamber 34 and a second portion 58 within the second stage chamber 36 of the combustion chamber 32, which second stage chamber 36 is placed between the cylinder head 20 and the top 46 of the piston 14, the top 46 of the piston 14 being juxtaposed with the cylinder head 20. Ignition means, including an igniter in the form of a spark plug 60, operates in synchronism with the movement of the piston 14 to ignite the first portion 56 of the charge of fuel 30, as seen in FIG. 2, so as to burn the first portion 56 when the first portion 56 is isolated from the second portion 58 of the charge of fuel 30. Continued upward movement of the piston 14, between the position illustrated in FIG. 2 and the position illustrated in FIG. 3, causes relative movement between the valve member 40 and the piston 14, enabled by downward flexing of the leaf spring 50.

The burning of the first portion 56 of the charge of fuel 30 increases the pressure in the first stage chamber 34, until the increased pressure attains a predetermined pressure which overcomes the force biasing the valve member 40 into the valve seat 42 so as to open communication between the first stage chamber 34 and the second stage chamber 36, as seen in FIG. 3. Upon opening communication between the first stage chamber 34 and the second stage chamber 36, the high temperature, high pressure combustion products in the first stage chamber 34 ignite the second portion 58 of the charge of fuel 30, which second portion 58 is in the second stage chamber 36, to initiate combustion in the second stage chamber 36. The intensity of the high temperature, high pressure combustion products emanating from the first stage chamber 34 over the entire relatively large area of communication opened up by movement of the valve member 40 away from the valve seat 42 very quickly effects combustion of the second portion 58 of the charge of fuel 30 in the second stage chamber 36 for the efficient ignition and combustion of the second portion 58 of the charge of fuel 30 in the second stage chamber 36. It is noted that the relatively large area of communication opened up by movement of the valve member 40 away from the valve seat 42 is an annular area 61 so that ignition and combustion of the second portion 58 of the charge of fuel 30 takes place over a full 360° extent for maximum effectiveness. As the piston 14 passes through the top dead center position, combustion is continued to drive the piston 14 downwardly, away from the top dead center position, through a power stroke.

Figure 4:
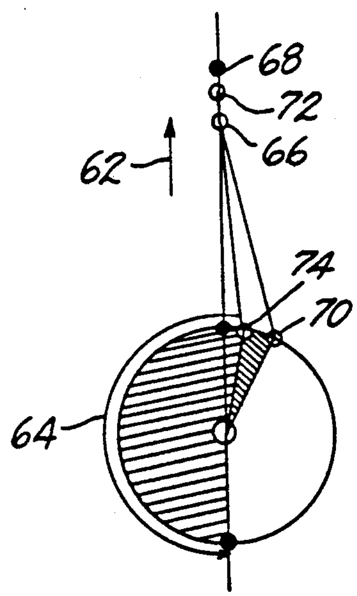
FIG. 4 is a diagram comparing the operation of the improved arrangement of FIGS. 1 through 3 with a conventional arrangement which does not incorporate the improvement of the present invention.

The two-stage combustion attained by the two-stage combustion chamber described above enables combustion to be initiated earlier during the travel of the piston 14 toward the top dead center position, thereby providing more time for combustion to take place and enabling more complete combustion for greater fuel efficiency and reduced pollutants. Thus, as seen in FIG. 4 in which the reciprocating movement of the piston 14 and the rotation of the crankshaft 16 are shown diagrammatically at 62 and 64, respectively, ignition of the charge of fuel 30 is initiated at the predetermined position of the piston 14 shown diagrammatically at 66, relative to top dead center 68, and corresponding position 70 of the crankshaft 16, well ahead of the position 72, and corresponding position 74 of the crankshaft 16, where ignition is initiated in a conventional reciprocating internal combustion engine which does not incorporate the improvement of the present invention. The ability to advance ignition of the charge of fuel accommodates high speed operation of the engine 10 while attaining more complete combustion of the charge of fuel for higher efficiency and better fuel economy, while reducing the emission of pollutants which otherwise would result from incomplete combustion.

It will be seen that the improvement of the present invention attains the several objects and advantages summarized above, namely: Enables more complete combustion of fuel for greater fuel efficiency and reduced emission of unwanted pollutants; provides a relatively simple modification which is adapted readily to existing internal combustion engine configurations, for widespread use in virtually all internal combustion engines of the type in which a piston reciprocates within a cylinder driven by the combustion of a charge of fuel in a combustion chamber; requires a minimum number of added parts for a maximum benefit; attains improved performance with minimal modification of current engine design; achieves added flexibility of operation, with increased power derived without a concomitant increase in fuel consumption; enables the modification of two-stroke as well as four-stroke engines for essentially universal application to current internal combustion reciprocating engine designs; is accomplished with component parts of simplified design and rugged construction for reliable performance over an extended service life.

It is to be understood that the above detailed description of a preferred embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An improvement in an internal combustion engine of the type in which a piston reciprocates within a cylinder toward a top dead center position to compress a charge of fuel within a combustion chamber, within which combustion chamber the charge is ignited by ignition means so as to burn and drive the piston away from the top dead center position through a power stroke, the improvement comprising:

a first stage chamber and a second stage chamber communicating with one another to establish the combustion chamber; and valve means for operation in synchronism with the reciprocation of the piston in the cylinder to close communication between the first stage chamber and the second stage chamber and isolate a first portion of the charge of fuel in the first stage chamber from a second portion of the charge of fuel in the second stage chamber when the piston reaches a predetermined position during movement of the piston toward the top dead center position;

the ignition means including an igniter operated by the ignition means in synchronism with the reciprocation of the piston in the cylinder to ignite the first portion of the charge of fuel in the first stage chamber so as to burn the first portion of the charge of fuel when the first portion is isolated from the second portion;

the valve means further operating to open communication between the first stage chamber and the second stage chamber subsequent to ignition of the first portion of the charge of fuel to effect ignition of the second portion of the charge by the first portion of the charge and completion of the power stroke of the piston;

the valve means including a valve seat and a valve member movable into the valve seat to close communication between the first stage chamber and the second stage chamber, and valve member actuating means carried by the piston for moving the valve member into the valve seat upon movement of the piston to the predetermined position of the piston.

2. The improvement of claim 1 wherein the valve member actuating means includes resilient biasing means for biasing the valve member toward the valve seat, the resilient biasing means permitting movement of the valve member away from the valve seat in response to a predetermined pressure in the first stage chamber resulting from the burning of the first portion of the charge of fuel in the first stage chamber.

3. The improvement of claim 2 wherein the valve means opens communication between the first stage chamber and the second stage chamber throughout a 360° annular area.

4. The improvement of claim 1 wherein the cylinder includes a cylinder head and the piston includes a top which is located in juxtaposition with the cylinder head when the piston reaches the top dead center position, the first stage chamber being located in the cylinder head and the valve member actuating means includes a valve actuator located in the top of the piston.

5. The improvement of claim 4 wherein the first stage chamber has a frusto-conical configuration.

6. The improvement of claim 4 wherein the valve actuator comprises a valve stem extending into the top of the piston and being movable relative to the piston in directions toward and away from the valve seat.

7. The improvement of claim 6 wherein the valve stem extends through the top of the piston and the valve member actuating means includes resilient biasing means in the piston and coupled with the valve stem for biasing the valve member toward the valve seat, the resilient biasing means permitting movement of the valve member away from the valve seat in response to a predetermined pressure in the first stage chamber resulting from the burning of the first portion of the charge of fuel in the first stage chamber.

8. The improvement of claim 7 wherein the resilient biasing means includes a leaf spring affixed to the valve stem and coupled with the piston.

* * * * *